United States Patent [19]

Thomson et al.

[11] 4,419,510

[45] Dec. 6, 1983

[54] METHOD FOR CONTROLLING CELLULOSE ETHERIFICATION REACTION

[75] Inventors: Timothy Thomson; Ferman Peters, both of Baton Rouge, La.

[73] Assignee: The Dow Chemical Company, Midland, Mich.

[21] Appl. No.: 403,898

[22] Filed: Jul. 30, 1982

[51] Int. Cl.³ .................. C08B 11/00; C08B 11/02
[52] U.S. Cl. ........................................ 536/84; 422/3; 422/83; 422/109; 536/91; 536/99
[58] Field of Search ................. 536/84, 90–100; 422/3, 83, 109

[56] References Cited

U.S. PATENT DOCUMENTS

| | | | |
|---|---|---|---|
| 2,492,524 | 12/1949 | Darling | 536/93 |
| 3,424,560 | 1/1969 | Carmassi et al. | 422/83 |
| 3,839,319 | 10/1974 | Greminger et al. | 536/91 |
| 4,015,067 | 3/1971 | Liu et al. | 536/96 |
| 4,096,325 | 6/1978 | Teng et al. | 536/91 |
| 4,121,922 | 10/1978 | Mackay et al. | 422/83 |
| 4,180,858 | 12/1979 | Gaines et al. | 364/502 |
| 4,251,224 | 2/1981 | Cowley et al. | 23/230 A |
| 4,251,503 | 2/1981 | Swindells et al. | 423/478 |
| 4,270,925 | 6/1981 | Isa et al. | 23/230 R |
| 4,272,481 | 6/1981 | Ahlstrom et al. | 422/83 |

Primary Examiner—Ronald W. Griffin

[57] ABSTRACT

This invention provides a method for controlling the reaction between cellulose and an etherifying agent which comprises the steps of (a) combining cellulose with an alkylene oxide and alkyl halide in a reactor wherein an etherification reaction is initiated which includes a vapor phase, (b) periodically measuring the quantity of at least one of the reactants or products in the vapor phase of the reactor and therewith determining the rate of the etherification reaction taking place, and (c) regulating the reaction temperature continuously while the reaction is taking place by using the rate of reaction determined in step (b) to determine the amount of heating or cooling needed for the reactor.

4 Claims, No Drawings

METHOD FOR CONTROLLING CELLULOSE ETHERIFICATION REACTION

BACKGROUND OF THE INVENTION

This invention relates to the production of cellulose ether compounds. More particularly, this invention relates to a method for controlling the reaction of cellulose with an etherifying agent.

In known processes for producing cellulose ether compounds, finely divided cellulose is usually reacted with an alkali hydroxide to form alkali cellulose, which in turn is then reacted with an alkyl halide and alkylene oxide in closed, batch reactors. These reactors normally include means for vigorous agitation, and means for heating and cooling to control the reaction temperature. Reaction control of these processes, as well as product quality, is often found to be unpredictable since the rate of reaction is determined by preset temperature/time schedules depending on the limitations of the reactors. Moreover, picking the best temperature/time schedules is extremely difficult since there are many variables which influence the cellulose etherification reaction rate such as heat transfer within the reactor, heat of reaction, amount of byproduct formation, concentration of caustic soda used to make the alkali cellulose, reactivity of the cellulose, and quantity and type of etherifying agents.

Problems concerning process control and product quality can be substantially solved by conducting the reaction at such a slow rate that the rate of temperature change in the reactor would be readily controllable. However, under present and foreseeable conditions, such an approach is impractical and uneconomical. Accordingly, the present practice is to complete the reaction as rapidly as possible, while trying to maintain the best requirements of quality control for the final product. However, since the reaction rate is influenced by so many variables, the temperature profile may vary substantially from batch to batch, as may the uniformity of the products produced.

SUMMARY

In general, the present method provides an improved means for controlling the reaction for making cellulose ether compounds from cellulose and an etherifying agent. As herein defined the term "cellulose" means cellulose itself from any source, alkali cellulose, or any derivative of cellulose. The method comprises the steps of (a) combining cellulose with an alkylene oxide and alkyl halide in a reactor wherein an etherification reaction is initiated which includes a solid phase and a vapor phase, (b) periodically measuring the quantity of at least one of the reactants or products in the vapor phase of the reactor and therewith determining the rate of the etherification reaction taking place, and (c) regulating the reaction temperature continuously while the reaction is taking place by using the rate of reaction determined in step (b) to determine the amount of heating or cooling needed for the reactor.

It is an object of this invention to provide a more efficient method for controlling the reaction between cellulose and an etherifying agent. It is a further object of this invention to provide a control system whereby the etherification reaction can be conducted as rapidly as possible while maintaining good temperature control. It is a further object of this invention to provide an automatic method for controlling the etherification of cellulose. It is a still further object of the invention to provide a method for continuous and substantially instantaneous control of reaction conditions in the etherification of cellulose. It is a still further object of the invention to provide a method which results in a superior cellulose-ether product. Other objects of the invention will be apparent to those skilled in the art from the more detailed description which follows.

DESCRIPTION OF THE PREFERRED EMBODIMENT

In the present method, a temperature schedule having a substantially uniform profile is generated for each reaction batch while the reaction is taking place. By this method a continuous adjustment is made for abnormal variations that characterize the reaction. Thus, the inherently more reactive batches are constrained to react more slowly, and the inherently less reactive batches are energized to react more rapidly, by adjusting reactor heating or cooling to achieve a fixed rate of energy release in the reaction system.

More specifically, the rate of reaction is monitored by sampling and analysis of the vapor phase in a reactor, and the temperature of the reactor is adjusted for the maximum rate of production of acceptable product. Thus, at low reaction rates, the reactor is heated rapidly, but as the reaction rate approaches the maximum controllable rate, the reactor is held isothermal. This method results in a twelve to fifteen percent reduction in reaction time (cycle time), as well as greatly improving temperature control during the reaction, and uniformity and quality of the reaction product.

The method of the present invention is preferably carried out substantially as follows:

(a) A convenient initial set point is chosen for the reactor temperature, usually between about 40° and about 45° C. Subsequent set point temperatures are then determined by means of the equation $$T_{sp} = T_{sp}' + S(dt/dt)_{max} \tag{1}$$

where
 $T_{sp}$ is the "new" desired set point temperature
 $T_{sp}'$ is the initially chosen set point temperature
 S is a parameter related to the reaction rate and
 $(dT/dt)_{max}$ is the maximum possible heating rate.
Thereafter set points are calculated at specific time intervals from the same equation (1), where $T_{sp}'$ is now the previously calculated set point.

(b) The parameter S is a function of the reaction rate, as previously stated. It is advantageously expressed as a linear function of the reaction rate, although other relationships are possible and feasible; e.g., exponential and logarithmic relationships. The following equation is used to calculated S:

$$S = 1 - Q/R_{max} \tag{2}$$

where Q is the measured reaction rate and $R_{max}$ is the desired maximum reaction rate. When the reaction rate is slow (approaching zero), the value of S approaches one, and the set point is $$T_{sp} = T_{sp}' + (dT/dt)_{max} \tag{3}$$

When the reaction rate reaches a value resulting in the highest rate of heat evolution which the equipment can "handle" at "full cooling", the value of S approaches zero and equation (1) reduces to $$T_{sp} = T_{sp}' \quad (4)$$

The effect is therefore to hold the reactor isothermal. In these calculations, in addition to the more important rate of reaction, a contribution is made by the rate of change of pressure. This second contribution serves as a safety device, backup system, for a reaction runaway.

In its preferred form the present invention includes the use of a minicomputer for automatic control of reactor temperature. The foregoing and above-described calculations are made by the minicomputer, hereinafter referred to as the controller, from data input to the minicomputer from an analyzer. The analyzer is directly connected to the vapor space, hereinafter referred to as the head space, of the reactor. Based on the results of the calculations, the controller "directs" the reactor system to raise or lower the temperature in accordance with Equations (1), (2), and (3). The overall result is automatic and efficient control of the entire process, from the production of alkali cellulose by reacting cellulose with aqueous concentrated sodium hydroxide solution, to the formation of the final cellulose-ether product by reaction of the alkali cellulose with one or more etherifying agents.

There are many known minicomputers and analyzers which can be used with the present method. Although there is no especially preferred minicomputer, the measurements for samples of reactant or product in the reactor head space depends on an accurate and precise analyzer which can be operated continuously in harsh plant environments with little maintenance. Preferably, the analyzer is a Beckman 7110 Process Gas Chromatograph with a thermoconductivity detector or a Mining Safety Associates Thermatron Analyzer, with the most preferred being the latter.

Examples of etherifying agents within the scope of the present invention include alkylene oxides, alkyl halides, and mixtures thereof. Specific examples of alkylene oxides suitable for use according to the method of this invention include ethylene oxide, propylene oxide, or a mixture thereof. Specific examples of alkyl halides beneficially useful in the method of the invention include methyl chloride, ethyl choride, or a mixture thereof.

Any reactant or product with a vapor pressure sufficient at reaction temperatures to provide an analytically-determinable concentration thereof in the vapor phase or headspace of a cellulose reactor is suitable for monitoring and controlling a cellulose-etherification reaction according to the present invention. Specific examples of such reactants and products include methanol, ethanol, dimethyl ether, methyl ethyl ether, ethylene oxide, propylene oxide, methyl chloride, ethyl chloride, or a mixture thereof.

The method of the present invention will now be further illustrated by means of the following examples, which are not to be interpreted as in any sense limiting the scope of the invention.

EXAMPLE 1

Three-thousand-five-hundred pounds of ground cellulose were loaded into a reactor. The reactor was sealed, and a reduced pressure of fifty millimeters of mercury (50 mm Hg) was drawn in the reactor. Seven thousand pounds of a fifty percent by weight concentrated aqueous solution of caustic soda was added to the reactor with vigorous agitation. After an aging period of ten minutes with constant agitation, five-thousand-one-hundred pounds of methyl chloride, eight-hundred-seventy-five pounds of dimethyl ether, and nine-hundred-eighty pounds of propylene oxide were charged to the reactor, with constant agitation. The reactor was agitated throughout the remainder of the run.

The reactor was rapidly heated to 45° C., and thereafter the temperature was controlled by a camming device that followed a preset temperature/time schedule. The cam took the reactor from 45° C. up to 80° C. over a 90-minute period, and then held the reactor isothermal at 80° C. for 60 minutes. Thereafter, the reactor was cooled and vented and the hydroxypropylmethylcellulose ether product was recovered. The total cycle (reaction) time was 150 minutes and the maximum deviation of actual reactor temperature from programmed reactor temperature was from 8 to 10 degrees Centigrade.

EXAMPLE 2

In this example, the reactor was first fitted with a minicomputer controller and a Mining Safety Associates Thermatron Analyzer to measure the concentrations of gases in the vapor space of the reactor. The reactor was then loaded with reactants the same as in Example 1.

After the reactor had been heated to 45° C., a temperature profile was generated and imposed on the reactor in the manner described hereinabove. The analyses of the vapor phase for methyl chloride, propylene oxide, and dimethyl ether were begun while the reactor was at 45° C., and were taken at one-minute intervals. The automatic controller carried the reactor from 45° C. up to 72° C. over a 66-minute period, and then maintained the reactor at this temperature for 18 minutes. The controller then raised the reactor temperature from 72° C. up to 78° C. over a 12-minute period, after which time the concentration of methyl chloride in the vapor phase remained constant, signalling the end of the reaction. The reactor was thereafter cooled and vented, and the hydroxypropylmethylcellulose ether product recovered. The total cycle time was 96 minutes—54 minutes shorter than in the comparative experiment described in Example 1. A very significant improvement in temperature control was evidenced by the fact that at no time was the reactor temperature more than one degree Centigrade above or below the programmed temperature.

While certain representative embodiments and details have been shown for the purpose of illustrating the present invention, it will be apparent to those skilled in the art that various changes and modifications can be made therein without departing from the spirit and scope of the invention.

What is claimed is:

1. A method for controlling the reaction for making cellulose ether compounds from cellulose and an etherifying agent comprising the steps of:
   (a) combining cellulose with an alkylene oxide and alkyl halide in a reactor wherein an etherification reaction is initiated which includes a vapor phase,
   (b) periodically measuring the quantity of at least one of the reactants or products in the vapor phase of the reactor and therewith determining the rate of the etherification reaction taking place, and (c) regulating the reaction temperature continuously while the reaction is taking place by using the rate of reaction determined in step (b) to determine the amount of heating or cooling needed for the reactor.

2. The method of claim 1 wherein the measured reactants and products are methanol, ethanol, dimethyl ether, diethyl ether, methyl ethyl ether, ethylene oxide, propylene oxide, methyl chloride, ethyl chloride, or mixtures thereof.

3. The method of claim 2 wherein methyl chloride is measured.

4. The method of claim 2 wherein dimethyl ether is measured.

* * * * *